(12) United States Patent
Marin Garcia et al.

(10) Patent No.: US 8,452,269 B2
(45) Date of Patent: May 28, 2013

(54) PROCESS FOR DELIVERING, TO A SUBSCRIBER OF A TELECOMMUNICATIONS NETWORK, CONTENT DEPENDING ON THE ACTIVITY PATTERN SUBSCRIBED TO BY SAID SUBSCRIBER

(75) Inventors: Francisco José Marin Garcia, Alcalá de Henares (ES); Francisco Javier Dominguez Palao, Saragossa (ES); Hector Berna Fornies, Saragossa (ES); Guillermo Caudevilla Laliena, Huesca (ES)

(73) Assignee: Vodafone Group PLC, Newbury, Berkshire (GB)

( * ) Notice: Subject to any disclaimer, the term of this patent is extended or adjusted under 35 U.S.C. 154(b) by 967 days.

(21) Appl. No.: 11/605,573

(22) Filed: Nov. 29, 2006

(65) Prior Publication Data
US 2007/0180091 A1  Aug. 2, 2007

(30) Foreign Application Priority Data
Nov. 29, 2005  (ES) .................................. 200502948

(51) Int. Cl.
*H04M 3/42* (2006.01)
(52) U.S. Cl.
USPC ................ 455/414.3; 455/410; 455/414.2; 370/230; 370/259
(58) Field of Classification Search
USPC ............... 455/410, 414.1–414.3; 370/230, 370/259; 726/2, 27, 28
See application file for complete search history.

(56) References Cited

U.S. PATENT DOCUMENTS
2002/0103892 A1* 8/2002 Rieger, III .................... 709/223
2005/0108096 A1* 5/2005 Burger et al. .................. 705/14
2006/0026162 A1* 2/2006 Salmonsen et al. ........... 707/10

OTHER PUBLICATIONS

Vartiainen, "Using Metadata and Context Information in Sharing Personal Content of Mobile Users", pp. 1-66.*
Eugster, et al. "The Many Faces of Publish/Subscribe", ACM Computing Surveys, vol. 35, No. 2, Jun. 2003, pp. 1140131.*
Vartiainen,. *"Using Metadata and Context Information in Sharing Personal Content of Mobile Users"* retrieved from the Internet url: http://koti.phnet.fi/{panuvart/vartiainen-thesis-2003.pdf>. pp. 1-66.
Eugster, et al., *"The Many Faces of Publish/Subscribe"* ACM Computing Surveys, vol. 35, No. 2, Jun. 2003. pp. 114-131.

* cited by examiner

*Primary Examiner* — George Eng
*Assistant Examiner* — Jing Gao
(74) *Attorney, Agent, or Firm* — Merchant & Gould P.C.

(57) ABSTRACT

The present invention relates to a process for delivering to a telecommunications network consuming subscriber (1, 1') content uploaded by a creating subscriber (2) depending on the activity pattern subscribed to by said consuming subscriber, comprising:

the consuming subscriber (1, 1') configures an activity pattern by defining an activity profile related to the creating subscriber who creates said content and a content profile related to said content that he/she is interested in receiving,
the creating subscriber (2) uploads content in a telecommunications network,
an activity pattern subscriptions manager (50) obtains an activity profile on said creating subscriber, and obtains a content profile on said content uploaded by the creating subscriber, and
the activity pattern subscriptions manager (50) compares said activity profile and content profile obtained for the creating subscriber with the activity profile and content profile configured by the consuming subscriber in the activity pattern, and in the event of matching
notifies said consuming subscriber of said content.

12 Claims, 1 Drawing Sheet

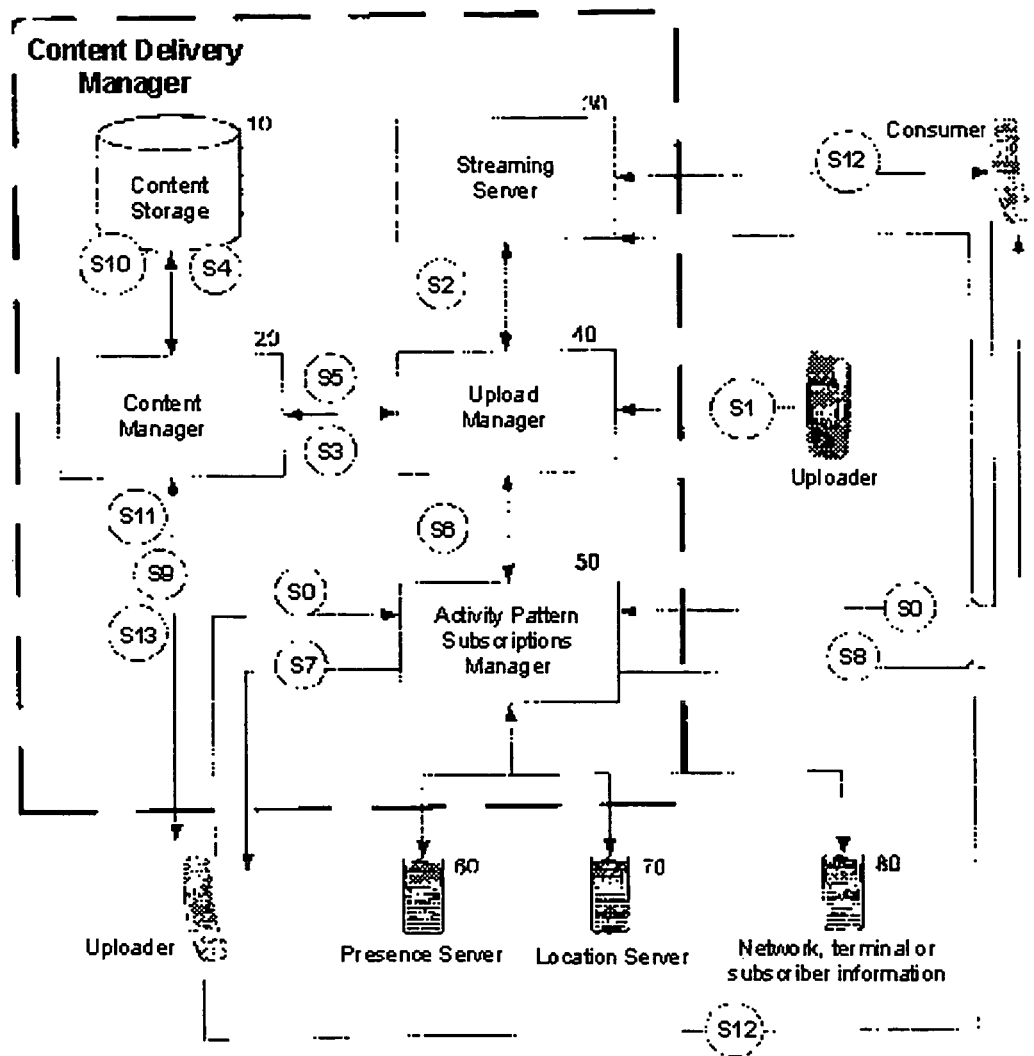

PROCESS FOR DELIVERING, TO A SUBSCRIBER OF A TELECOMMUNICATIONS NETWORK, CONTENT DEPENDING ON THE ACTIVITY PATTERN SUBSCRIBED TO BY SAID SUBSCRIBER

FIELD OF THE INVENTION

This invention is encompassed within the field of telecommunications networks, and more specifically in the possibility of offering mobile telephony subscribers access to any type of content (news, images, videos, music, sound, voice, text, . . . ) that may be of his/her interest both due to the features of said content and due to the features of the subscriber that has created that content.

BACKGROUND OF THE INVENTION

A series of terms which are used in this specification are defined below:

Activity profile: this is the set of network, service and subscriber behavior characters associated to a subscriber. One part of the activity profile is formed by the Presence Information—type of network in which the subscriber is connected, state, expression of wishes, etc.—; another part is the Location Information, and additionally information regarding the terminal, network information associated to the subscriber, information about the subscriber (whether or not he/she is very active loading information, classification of his/her popularity in the network, if it is the first time he/she uploads content, etc.).

Content profile: this is the set of information describing the content. It may be the title, a description, key words, classification, file in which it can be found, type (text, image, speech, video, news, link, etc.). This information may be intrinsic to the content or it may be added later by the creator of the content or another entity.

Today, when a mobile phone user requests contents of a particular type with a particular frequency, for example repeatedly requesting information about aquatic sports, by analyzing the content profile of said user, the operator can detect the interest the subscriber has in this particular content (e.g. aquatic sports); the operator can decide to deliver to said subscriber content which is similar to the content which said subscriber has shown an interest in based on this analysis of the content profile of the subscriber.

For example, patent application US-2005/0165643 describes a method for the universal synchronization of profiles of audience member for the delivery of content. A unique global identifier may be assigned to and used to manage a profiled audience member.

Also, patent application US-2004/0111473 relates to a method and a system for instantaneous on-demand delivery of multimedia content in a communication network with the aid of a content capturing component, a delivery-on-demand client and a dynamically mapped resource locator server.

However, according to the processes hereinbefore described, they do not allow a user who is interested in a particular type of information, the content of which has a series of specific features and has been created by another subscriber with other specific features, to be notified of the existence of said information of his/her interest.

DESCRIPTION OF THE INVENTION

The invention relates to a process and system for delivering to a subscriber of telecommunications network content depending on the activity pattern subscribed to by said subscriber according to claims 1 and 9, respectively. Preferred embodiments of the process and the system are defined in the dependent claims.

To avoid the problem indicated in the foregoing, this invention provides a process for delivering a specific content to a subscriber according to the activity pattern said subscriber has subscribed to.

Activity pattern is understood to be the set of characteristics that a subscriber indicates to automatically receive a specific content or information when the characteristics specified in said pattern are met. The activity pattern is made up of two sets of characters: subscriber characters (activity profile) and content characters (content profile).

In other words, when a subscriber wishes to subscribe to an activity pattern he/she indicates the set of conditions defined in the form of characteristics related to the information he/she wishes to be delivered, subject to being evaluated. When the conditions specified by the subscriber are met, a specific content is delivered to said subscriber provided that said content is present.

A first aspect of the present invention relates to a process for delivering to a telecommunications network consuming subscriber content uploaded by a creating subscriber according to the activity pattern that said consuming subscriber has subscribed to, comprising:

the consuming subscriber configures an activity pattern by defining an activity profile related to the creating subscriber who creates said content and a content profile related to said content that he/she is interested in receiving, The creating subscriber uploads content in a telecommunications network, an activity pattern subscriptions manager obtains an activity profile on said creating subscriber, and obtains a content profile of said content uploaded by the creating subscriber, and the activity pattern subscriptions manager compares said activity profile and content profile obtained for the creating subscriber with the activity profile and content profile configured by the consuming subscriber in the activity pattern, and in the event of matching notifies said consuming subscriber of said content.

The consuming subscriber can further be provided with a link to said content.

The activity pattern subscriptions manager obtains the activity profile on said subscriber preferably by means of consultations with components of the telecommunications network. These components of the network can be a presence server, a location server, terminal databases, subscriber-associated network information, subscriber information, etc.

Said content uploaded by the creator subscriber can be stored in a content storage, and can be managed by a content manager. Said content manager can manage access to said content, granting or refusing the access to the content.

In the event that the content is streaming content, it can be managed by a streaming server during its uploading by the creating subscriber, and also during its presentation/downloading to the consuming subscriber A second aspect of the present invention relates to a system for delivering to a telecommunications network consuming subscriber content uploaded by a creating subscriber depending on an activity pattern subscribed to by said consuming subscriber, comprising:

means for storing an activity pattern configured by the consuming subscriber, including an activity profile related to the creating subscriber who creates said content and a content profile related to said content that he/she is interested in receiving, Means for storing a content uploaded by the creating subscriber, an activity pattern subscriptions manager configured to obtain an activity profile on said creating subscriber, and a content profile of said content uploaded by the creating subscriber, and the activity pattern subscriptions manager configured to compare said activity profile and content profile obtained for the creating subscriber with the activity profile and content profile configured by the consuming subscriber in the activity pattern, and in the event of matching, The activity pattern subscriptions manager is configured to notify said consuming subscriber of said content.

Includes means for providing the consuming subscriber with a link to said content.

The activity pattern subscriptions manager preferably includes means of connecting with components of the telecommunications network, from which it obtains the activity profile on said creating subscriber. Said components are preferably a presence server, a location server and/or terminal information databases, network and subscriber. Therefore, by means of this connection with databases of the external network additional information that can be included in the activity profile can be accessed.

The activity pattern subscriptions manager preferably includes means of connecting with an upload manager, from which it obtains the content profile of the content uploaded by the creating subscriber.

The system of the invention preferably includes a content storage and a content manager for storing and managing, respectively, said content uploaded by the creating subscriber.

In the event that said content is streaming content, the system preferably includes a streaming server.

BRIEF DESCRIPTION OF THE DRAWINGS

A drawing is very briefly described below which aids in better understanding the invention and is expressly related to an embodiment of said invention, presented as an illustrative but non-limiting example thereof.

FIG. 1 shows an example of the content delivery process in the case of a subscriber in a mobile telephony network, with the different components involved therein.

DESCRIPTION OF A PREFERRED EMBODIMENT OF THE INVENTION

FIG. 1 shows an example of the content delivery process of the invention for the specific case of a mobile telephony network, showing the different components forming part of the process.

In that aspect FIG. 1 shows the following functional components:

Content storage 10, which is the database in which the content is going to be stored;

Content manager 20, which is the functional entity that manages the content that is going to be displayed to the subscribers. It manages access to the content storage, stores new content, recovers the stored content, provides other functional entities with the link to stored content, etc.

streaming server 30 ("streaming": reproduction of audio or video in real time as it is being downloaded from Internet rather than storing it first in a local file), which is a server displaying streaming to the subscribers;

upload manager 40, which is the functional entity capable of managing the uploading of content from the subscriber who generates it (for both real time and non-real time) to the system. There can be different processes for doing this: multimedia messenger service, client server processes, IMS (IP Multimedia Subsystem), etc.; and activity pattern subscriptions manager 50 APSM, which is the functional entity that accepts requests for creating a specific activity pattern and detects when the specified conditions are met. The APSM notifies the subscriber when the conditions of the created activity pattern have been met.

In the process of the invention, it further interacts with several "passive" elements forming part of the network: the presence server 60, the location server 70 and network, terminal or subscriber information databases 80. By means of this network, terminal or subscriber information databases 80 of the external network additional information that may be included in the activity profile can be accessed.

On the other hand, the subscribers are part of the process; on one hand are the creating subscribers 2, who create content, and the consuming subscribers 1, 1' who wish to access specific content for which purpose they subscribe to a specific activity pattern.

According to the process of the invention, a consuming subscriber 1, 1' creates a specific activity pattern for himself/herself (step S0). In other words, the consuming subscriber establishes conditions regarding the activity profile of a creating subscriber 2 and regarding any type of content (content profile) he/she wishes to receive. For example, the consuming subscriber 1 creates an activity pattern in which he/she indicates in the content profile that he/she is interested in "America's Cup" and in the activity profile he/she indicates that he/she is interested in creating subscribers located in "Valencia Port" and whose mobile terminal has "3G video". The consuming subscriber is thus indicating his/her interest in subscribers who may be recording the America's Cup in the Valencia Port and who may be uploading it onto the network.

When a creating subscriber 2 uploads new content (step S1), the upload manager 50 analyzes the type of content that said subscriber is uploading; in the event that it is streaming content, the upload manager 50 sends the content to the streaming server (step S2) and notifies the content manager 20 of the Content Profile of the content. In the event that it is not streaming content, the upload manager sends the content to the content manager (step S3), also notifying of the content profile.

The content and the associated information are stored in the content storage 10 and the upload manager 40 is notified of the result in addition to being provided with a link to the content (steps S4 and S5).

The upload manager informs the activity pattern subscriptions manager APSM 50 of the new content that has been uploaded by the creating subscriber 2, providing information about the content and on the creating subscriber: his/her content profile and the identity of the person that uploaded the information (step S6).

The APSM 50 makes the necessary requests to external systems—presence server 60, location server 70 and network, terminal or subscriber information databases 80—about the specific information of the subscriber so as to evaluate the activity profile of the creating subscriber who created (or uploaded) the information. This information is sent back to the content manager 20 to obtain further details and the latter classifies the information so as to facilitate search processes.

The APSM 50 then composes the activity pattern of the creating subscriber (activity profile) and of the content that he/she is creating (content profile) and checks if it matches any activity pattern created by a consuming subscriber. If it matches an activity pattern, the subscriber who activated said activity pattern is notified whether the content is streaming content (content in real time, step S8) or not (content in non-real time, step S7).

These notifications contain a link with the address so that the consuming subscriber can access the content. When the terminal of the consuming subscriber receives the notification, he/she may act transparently before the subscriber and directly download the content (step S9), which has been stored in the content storage (steps S10, S11). For the case of content in real time (streaming), the terminal accesses, from the link received, the streaming server 30 to download the streaming (step S12).

It is also possible that the content is accessed directly by the subscribers without having received notifications (or ignoring them) by accessing the content manager 20 and navigating in it. The content is classified and searches can be carried out using the information of the stored activity pattern associated to the content; the latter can be accessed using the suitable link (step S13). If the link corresponds to streaming, the subscriber is rerouted to the streaming server (step S12).

Action restrictions can be applied in the content manager 20 if they are necessary.

The invention claimed is:

1. A process for delivering a content uploaded by a creating subscriber to a consuming subscriber, based on an activity pattern subscribed to by the consuming subscriber, the creating subscriber and the consuming subscriber being subscribers of a telecommunications network, the process comprising:
  receiving an activity pattern configuration from the consuming subscriber establishing conditions regarding an activity profile related to creating subscribers who create and upload said content in the telecommunications network and regarding content profiles related to said content in which the consuming subscriber specifies which specific content is to be delivered, the activity profile comprising:
    presence information of the creating subscriber,
    actual physical location information of the creating subscriber, and
    information regarding a terminal, network information associated to the creating subscriber, and information about the creating subscriber;
  when the creating subscriber uploads content in the telecommunications network, obtaining the activity profile on said creating subscriber with an activity pattern subscriptions manager by communicating with components of the telecommunications network, the components comprising:
    a presence server for obtaining the presence information of the creating subscriber,
    a location server for obtaining the location information of the creating subscriber, and
    terminal, network, and subscriber information databases for obtaining information regarding the terminal, network information associated to the creating subscriber and information about the creating subscriber;
  obtaining a content profile with the activity pattern subscriptions manager on said content uploaded by the creating subscriber; and
  comparing, with the activity pattern subscriptions manager, said activity profile and content profile obtained for the creating subscriber with the conditions regarding the activity profile and the content profile configured by the consuming subscriber in the activity pattern; and
  when matching, notifying said consuming subscriber of said content.

2. A process according to claim 1, further comprising providing the consuming subscriber with a link to said content.

3. A process according to claim 1, wherein the activity pattern subscriptions manager obtains the content profile on the content uploaded by said creating subscriber through an upload manager.

4. A process according to claim 1, wherein said content uploaded by the creating subscriber is stored in a content storage and managed by a content manager.

5. A process according to claim 4, wherein said content manager manages access to said content storage.

6. A process according to claim 1, wherein if said content is a streaming content, said streaming content is managed by a streaming server during its uploading by the creating subscriber and during its presentation/downloading to the consuming subscriber.

7. A system for delivering to a telecommunications network consuming subscriber content uploaded by a creating subscriber based on an activity pattern subscribed to by a consuming subscriber, the system comprising:
  means for storing an activity pattern configured by the consuming subscriber establishing conditions regarding an activity profile related to creating subscribers who create and upload said content in a telecommunications network and regarding a content profiles related to said content in which the consuming subscriber specifies which specific content is to be delivered, the activity profile comprising:
    presence information of the creating subscriber,
    actual physical location information of the creating subscriber, and
    information regarding a terminal, network information associated to the creating subscriber, and information about the creating subscriber;
  means for storing said content uploaded by the creating subscriber;
  an activity pattern subscriptions manager configured to obtain an activity profile on said creating subscriber, by communicating with components of the telecommunications network, the components comprising:
    a presence server for obtaining the presence information of the creating subscriber,
    a location server for obtaining the location information of the creating subscriber, and
    terminal, network, and subscriber information databases for obtaining information regarding the terminal, network information associated to the creating subscriber, and information about the creating subscriber,
  and to obtain a content profile of said content uploaded by the creating subscriber; and
  the activity pattern subscriptions manager configured to compare said activity profile and content profile obtained for the creating subscriber with conditions regarding the activity profile and the content profile configured by the consuming subscriber in the activity pattern; and
  the activity pattern subscriptions manager is configured to notify said consuming subscriber of said content when matching.

8. A system according to claim 7, further comprising means for providing the consuming subscriber with a link to said content.

9. A system according to claim 7, wherein the activity pattern subscriptions manager includes means of connecting with an upload manager, from which it obtains the content profile of the content uploaded by the creating subscriber.

10. A system according to claim 7, further comprising a content storage and a content manager for storing and managing, respectively, said content uploaded by the creating subscriber.

11. A system according to claim 7, further comprising a streaming server when said content is streaming content.

12. A process for delivering a content uploaded by a creating subscriber to a consuming subscriber, based on an activity pattern subscribed to by the consuming subscriber, the creating subscriber and the consuming subscriber being subscribers of a telecommunications network, the process comprising:
- receiving an activity pattern configuration from the consuming subscriber establishing conditions regarding an activity profile related to creating subscribers who create and upload said content in the telecommunications network and regarding content profiles related to said content in which the consuming subscriber specifies which specific content is to be delivered, the activity profile comprising:
  - presence information of the creating subscriber,
  - location information of the creating subscriber including a textual input defining a specific geographic location, and
  - information regarding a terminal, network information associated to the creating subscriber, and information about the creating subscriber;
- when the creating subscriber uploads content in the telecommunications network, obtaining the activity profile on said creating subscriber with an activity pattern subscriptions manager by communicating with components of the telecommunications network, the components comprising:
  - a presence server for obtaining the presence information of the creating subscriber,
  - a location server for obtaining the location information of the creating subscriber, and
  - terminal, network, and subscriber information databases for obtaining information regarding the terminal, network information associated to the creating subscriber, and information about the creating subscriber;
- obtaining a content profile with the activity pattern subscriptions manager on said content uploaded by the creating subscriber; and
- comparing, with the activity pattern subscriptions manager, said activity profile and content profile obtained for the creating subscriber with conditions regarding the activity profile and the content profile configured by the consuming subscriber in the activity pattern; and
- when matching, notifying said consuming subscriber of said content.

\* \* \* \* \*